No. 649,775. Patented May 15, 1900.
J. M. SWEET.
TIRE FOR VEHICLE WHEELS.
(Application filed Mar. 21, 1900.)
(No Model.)
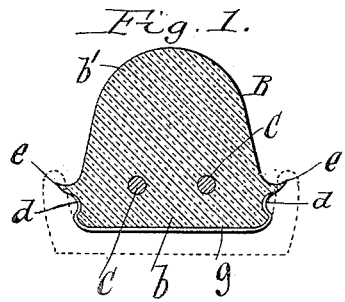
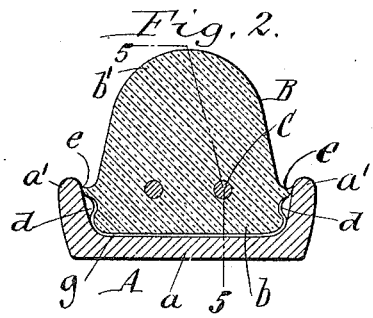
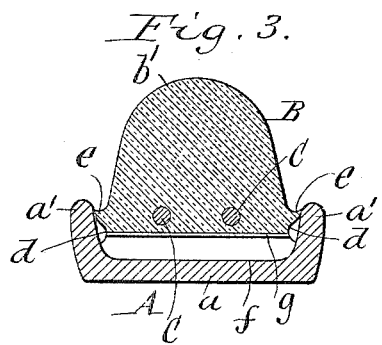
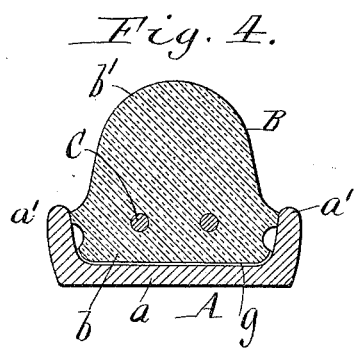
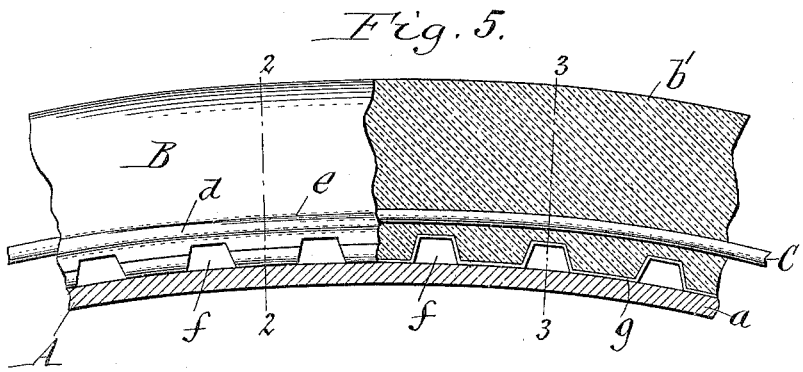
Witnesses:
Henry L. Deck.
F. H. Schuzinger.
John M. Sweet, Inventor.
By Wilhelm Bonnet,
Attorneys.

UNITED STATES PATENT OFFICE.

JOHN M. SWEET, OF BATAVIA, NEW YORK, ASSIGNOR TO FRANK RICHARDSON, TRUSTEE, OF SAME PLACE.

TIRE FOR VEHICLE-WHEELS.

SPECIFICATION forming part of Letters Patent No. 649,775, dated May 15, 1900.

Application filed March 21, 1900. Serial No. 9,498. (No model.)

*To all whom it may concern:*

Be it known that I, JOHN M. SWEET, a citizen of the United States, residing at Batavia, in the county of Genesee and State of New York, have invented new and useful Improvements in Tires for Vehicle-Wheels, of which the following is a specification.

This invention relates to cushion rubber tires for vehicle-wheels, and has for its object to construct the tire in such manner that longitudinal displacement or creeping of the tire in the channel is avoided. In rubber tires as usually constructed and applied to wheels the base of the tire is confined laterally between the side flanges of the wheel-channel and cannot yield laterally in the channel. The displacement of the rubber in the channel caused by pressure applied to the tread therefore necessarily takes place lengthwise of the channel and causes the tire to creep in the same. I overcome this difficulty by so constructing the tire that the rubber forming the base can yield laterally in the wheel-channel, thereby enabling the displacement of the rubber under pressure to take place laterally and avoiding the lengthwise displacement and the creeping resulting therefrom.

In the accompanying drawings, Figure 1 is a cross-section of my improved tire, showing the tire before it is applied to the wheel-channel and showing the latter in dotted lines. Fig. 2 is a similar cross-section showing the tire applied to the wheel-channel, the section being taken in line 2 2, Fig. 5. Fig. 3 is a similar cross-section in line 3 3, Fig. 5. Fig. 4 is a similar cross-section showing a tire formed without projecting side lips. Fig. 5 is a fragmentary longitudinal sectional elevation of my improved tire applied to the wheel-channel, the left-hand portion of the figure showing the tire in side elevation and the right-hand portion in a longitudinal section, taken in line 5 5, Fig. 2.

Like letters of reference refer to like parts in the several figures.

A represents the channeled rim, of iron or steel, which is applied to the outer side of the felly of the wheel in the usual way.

$a$ represents the body, and $a'$ the outwardly-diverging side flanges, of the rim.

B represents the rubber tire, which is arranged with its base portion $b$ within the channel of this rim and which has its tread $b'$ arranged beyond or outside of the side flanges of this rim. The tire is secured to the rim A in a well-known manner by one or more wires, rods, or bands, which are arranged in corresponding longitudinal openings formed in the base portion $b$ of the tire. Two such fastening-wires C are shown in the drawings.

The base portion $b$ of the tire is provided in each side with a longitudinal groove, depression, or recess $d$, which forms an open space along the inner side of the base adjacent to the side flanges of the rim. This open space allows the rubber composing the base portion of the tire to move or yield laterally under pressure toward the adjacent side flange. By so providing the base of the tire with the capacity to yield laterally between the flanges of the rim the necessity to yield longitudinally under pressure is relieved, and creeping of the tire in the rim is to a corresponding extent prevented.

In the preferred construction of the tire (represented in Figs. 1 to 4) the tire is provided on each side, above the groove $d$, with a laterally-projecting lip $e$. This lip is made of such size and form that when it is unrestrained, as shown in Fig. 1, it projects laterally beyond the inner side of the adjacent side flange of the channeled rim and that upon drawing the tire into the channeled rim by tightening the fastening-wires the lips are tightly pressed against the inner sides of the rim-flanges and form a sufficiently-tight closure to prevent sand and other solid matter from working into the rim and filling the grooves or depressions in the sides of the base of the tire.

In the construction of the tire represented in Fig. 4 the lips are omitted and the side of the base of the tire above and below the groove is shaped to fit snugly against the inner side of the adjacent rim-flange. This construction is, however, less desirable, because it does not absolutely prevent solid matter from working into the grooves, and the efficiency of the latter in preventing creeping of the tire in the rim is therefore liable to be impaired.

The base of the tire may be provided in its bottom with transverse grooves, recesses, or indentations $f$ for the purpose of allowing the base to be contracted lengthwise in applying the tire to the curved wheel-rim, thereby avoiding the stretching of the tread and allowing the latter to remain in its natural condition of flexibility.

$g$ represents the usual canvas covering, which is applied to the bottom of the tire and which is preferably extended into the bottom grooves $f$, which latter do not only render the base of the tire more flexible, but also reduce the weight of the tire considerably and correspondingly reduce its cost.

I claim as my invention—

1. The combination with a channeled wheel-rim, of a rubber tire arranged with its base portion between the side flanges of the channeled rim and having in the side of its base portion a longitudinal groove or depression which forms an open space between the side of the base and the adjacent rim-flange, and a fastening wire, rod or band arranged in a opening formed in the base of the tire substantially as set forth.

2. The combination with a channeled wheel-rim, of a rubber tire arranged with its base portion between the side flanges of the channeled rim and having in the side of its base portion a longitudinal groove or depression which forms an open space between the side of the base and the adjacent rim-flange and having above or outside of such groove or depression a lip which when unrestrained projects laterally beyond the inner side of the adjacent rim-flange and which is pressed tightly against the inner side of the adjacent flange upon drawing the tire into the channeled rim, and a fastening wire, rod or band arranged in an opening formed in the base of the tire, substantially as set forth.

Witness my hand this 19th day of March, 1900.

JOHN M. SWEET.

Witnesses:
EDWARD WILHELM,
CYESTA HORNBECK.